(12) United States Patent
Rajarathinam et al.

(10) Patent No.: US 10,386,812 B2
(45) Date of Patent: Aug. 20, 2019

(54) APPARATUS, METHODS, COMPUTER PROGRAMS AND NON-TRANSITORY COMPUTER READABLE STORAGE MEDIUMS FOR MACHINING OBJECTS

(71) Applicant: ROLLS-ROYCE PLC, London (GB)

(72) Inventors: Manikanta Saravanan Rajarathinam, Singapore (SG); Wu Xin Charles Ng, Singapore (SG); Vigneshwaran Ramalingam, Singapore (SG)

(73) Assignee: ROLLS-ROYCE plc, London (GB)

( * ) Notice: Subject to any disclaimer, the term of this patent is extended or adjusted under 35 U.S.C. 154(b) by 343 days.

(21) Appl. No.: 15/235,735

(22) Filed: Aug. 12, 2016

(65) Prior Publication Data

US 2017/0075338 A1    Mar. 16, 2017

(30) Foreign Application Priority Data

Sep. 10, 2015   (GB) .................................. 1516019.5

(51) Int. Cl.
| | | |
|---|---|---|
| *G05B 19/402* | (2006.01) | |
| *B24D 5/02* | (2006.01) | |
| *B24B 21/12* | (2006.01) | |
| *B24D 5/10* | (2006.01) | |
| *B24B 51/00* | (2006.01) | |

(52) U.S. Cl.
CPC ............ *G05B 19/402* (2013.01); *B24B 21/12* (2013.01); *B24B 51/00* (2013.01); *B24D 5/02* (2013.01); *B24D 5/10* (2013.01); *G05B 2219/32105* (2013.01); *G05B 2219/39246* (2013.01)

(58) Field of Classification Search
CPC .. B24B 5/02; B24B 5/10; B24B 21/12; B24B 21/14; B24B 49/00; B24B 51/00
USPC ......................................... 451/303, 541, 547
See application file for complete search history.

(56) References Cited

U.S. PATENT DOCUMENTS

| | | | | |
|---|---|---|---|---|
| 1,736,355 A | * | 11/1929 | Mosher .................... | B24D 7/10 451/547 |
| 2,049,874 A | * | 8/1936 | Sherk ....................... | B24D 5/02 451/547 |
| 2,270,258 A | * | 1/1942 | Buchmann ............... | B24D 5/02 428/592 |
| 2,725,691 A | * | 12/1955 | Sommer ................... | B24B 9/10 116/DIG. 42 |

(Continued)

FOREIGN PATENT DOCUMENTS

| | | |
|---|---|---|
| DE | 7605221 U1 | 7/1976 |
| DE | 4333734 A1 | 4/1995 |

(Continued)

*Primary Examiner* — Timothy V Eley
(74) *Attorney, Agent, or Firm* — Oliff PLC

(57) ABSTRACT

An apparatus for machining an object includes a wheel having a first circular surface, a second circular surface oriented parallel to the first circular surface, a first rim surface extending from the first circular surface at a first edge, and a second rim surface extending from the second circular surface at a second edge and towards the first rim surface. A gradient of the first rim surface has a radial component, and a gradient of the second rim surface has a radial component. The first edge defines a curved surface between the first circular surface and the first rim surface, and the second edge defines a curved surface between the second circular surface and the second rim surface.

10 Claims, 8 Drawing Sheets

(56) References Cited

U.S. PATENT DOCUMENTS

| | | | | |
|---|---|---|---|---|
| RE24,152 E | * | 5/1956 | Cosmos | B24B 21/14 451/303 |
| 2,806,379 A | * | 9/1957 | Haracz | B24B 21/14 474/188 |
| 3,023,546 A | * | 3/1962 | Beck | B24B 3/18 451/120 |
| 3,613,316 A | * | 10/1971 | Eten | B24B 21/14 451/303 |
| 4,977,709 A | * | 12/1990 | Siden | B24B 3/33 451/541 |
| 5,339,570 A | * | 8/1994 | Amundson | B24B 21/14 451/303 |
| 5,954,568 A | * | 9/1999 | Wirz | B24B 53/075 125/11.01 |
| 6,491,568 B1 | * | 12/2002 | Jankowski | B24B 53/075 451/253 |
| 6,663,471 B2 | * | 12/2003 | Kawamura | B24B 1/00 451/209 |
| 6,893,324 B1 | * | 5/2005 | Laycock | B24B 5/01 451/124 |
| 9,969,058 B2 | * | 5/2018 | Rizzo | B24D 7/18 |
| 2007/0232202 A1 | * | 10/2007 | Schneeberger | B24B 3/36 451/45 |
| 2015/0375357 A1 | * | 12/2015 | Chen | B24B 21/16 451/303 |

FOREIGN PATENT DOCUMENTS

| | | |
|---|---|---|
| DE | 4421395 A1 | 1/1996 |
| DE | 102011100972 A1 | 11/2012 |
| GB | 820339 A | 9/1959 |
| GB | 2270485 A | 3/1994 |
| JP | S578081 A | 1/1982 |
| SU | 901029 A1 | 1/1982 |
| SU | 1399085 A1 | 5/1988 |

* cited by examiner

APPARATUS, METHODS, COMPUTER PROGRAMS AND NON-TRANSITORY COMPUTER READABLE STORAGE MEDIUMS FOR MACHINING OBJECTS

TECHNOLOGICAL FIELD

The present disclosure concerns apparatus, methods, computer programs, and non-transitory computer readable storage mediums for machining objects

BACKGROUND

Contact wheels may be used to machine objects such as fan blades of gas turbine engines. For example, a contact wheel may be used in conjunction with an abrasive belt to linish a wide chord fan blade (WCFB) to remove a surface layer that is formed during a preceding hot superplastic forming (SPF) process.

Contact wheels have flat circumferential surfaces which may be unable to access concave features of an object (such as the root fillet of a fan blade). Currently, an operator may handle the machining apparatus to manually move the contact wheel against the object to machine such features on the object. However, such manual handling of the machining apparatus may present health and safety risks. For example, machining a fan blade of a gas turbine engine may produce titanium dust which is a fire hazard. Furthermore, manually handling the machining apparatus may cause an industrial injury such as hand-arm vibration syndrome (HAVS) (also known as vibration white finger (VWF)).

BRIEF SUMMARY

According to various, but not necessarily all, examples there is provided apparatus for machining an object, the apparatus comprising: a wheel having a circumference, the wheel including: a first circular surface; a second circular surface oriented parallel to the first circular surface; a first rim surface extending from the first circular surface at a first edge and defining at least a part of the circumference of the wheel, a gradient of the first rim surface having a radial component; and a second rim surface extending from the second circular surface at a second edge and towards the first rim surface, the second rim surface defining at least a part of the circumference of the wheel, a gradient of the second rim surface having a radial component, the first edge defining a curved surface between the first circular surface and the first rim surface, and the second edge defining a curved surface between the second circular surface and the second rim surface.

According to various, but not necessarily all, examples there is provided apparatus for machining an object, the apparatus comprising: a wheel having a circumference, the wheel including: a first circular surface; a second circular surface oriented parallel to the first circular surface; a first rim surface extending from the first circular surface at a first edge and defining at least a part of the circumference of the wheel, a gradient of the first rim surface having a radial component; and a second rim surface extending from the second circular surface at a second edge and towards the first rim surface, the second rim surface defining at least a part of the circumference of the wheel, a gradient of the second rim surface having a radial component, the first edge defining a curved surface between the first circular surface and the first rim surface.

The first rim surface and the second rim surface may be directly joined to one another with no intervening surfaces there between.

The first rim surface and the second rim surface may abut one another at a location equidistant between the first circular surface and the second circular surface.

The first rim surface, the second rim surface, the first edge and the second edge may be arranged to receive an abrasive belt for linishing the object.

The first rim surface, the second rim surface, the first edge and the second edge may comprise an abrasive material for polishing or grinding the object.

The first rim surface, the second rim surface, the first edge and the second edge may define a plurality of grooves.

The object may include a filleted part extending along a longitudinal axis. The apparatus may further comprise a controller configured to control orientation of the wheel and/or the object so that a cylindrical axis of the wheel is orthogonal to the longitudinal axis of the filleted part during machining of the object.

The wheel may include a hub comprising aluminium and a perimeter section comprising rubber.

According to various, but not necessarily all, examples there is provided a method of controlling apparatus as described in any of the preceding paragraphs to machine an object including a filleted part extending along a longitudinal axis, the method comprising: controlling orientation of the wheel and/or the object so that a cylindrical axis of the wheel is orthogonal to the longitudinal axis of the filleted part during machining of the object.

According to various, but not necessarily all, examples there is provided a computer program that, when read by a computer, causes performance of the method as described in any of the preceding paragraphs.

According to various, but not necessarily all, examples there is provided a non-transitory computer readable storage medium comprising computer readable instructions that, when read by a computer, cause performance of the method as described in any of the preceding paragraphs.

According to various, but not necessarily all, examples there is provided apparatus for controlling machining of an object, the apparatus comprising: a controller configured to perform a method as described in any of the preceding paragraphs.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
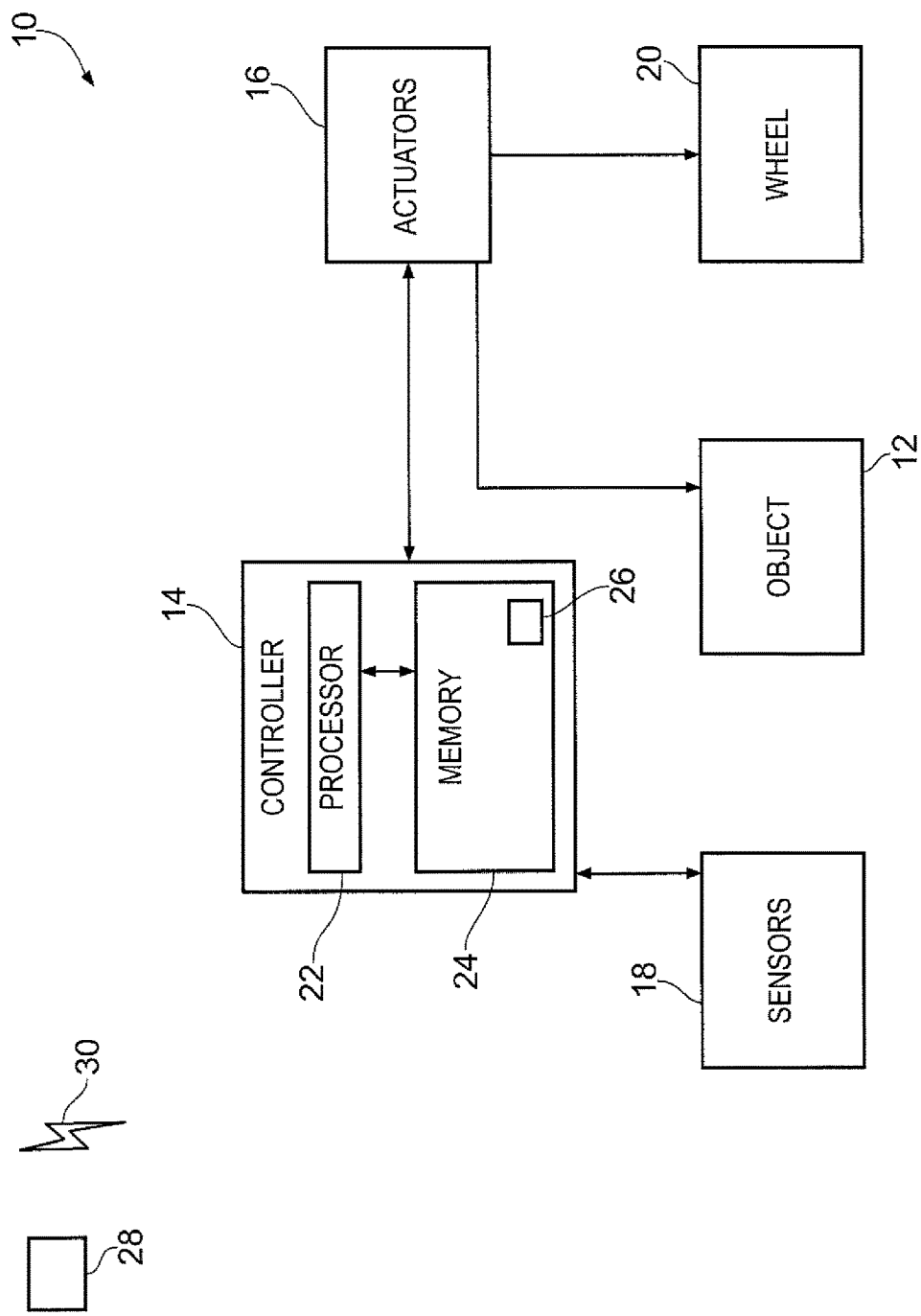
FIG. 1 illustrates a schematic diagram of an apparatus for machining an object according to various examples.

FIG. 1 illustrates a schematic diagram of an apparatus 10 for machining an object 12. The apparatus 10 includes a controller 14, one or more actuators 16, one or more sensors 18, and a wheel 20. In some examples, the apparatus 10 may be a module. As used herein, the wording 'module' refers to a device or apparatus where one or more features are included at a later time, and possibly, by another manufacturer or by an end user. For example, where the apparatus 10 is a module, the apparatus 10 may only include the wheel 20, and the remaining features (such as the controller 14, the actuators 16, and the sensors 18) may be added by another manufacturer, or by an end user. By way of another example, where the apparatus 10 is a module, the apparatus 10 may only include the controller 14, and the remaining features (such as the actuators 16, the sensors 18 and the wheel 20) may be added by another manufacturer, or by an end user.

The object 12 may be any object for machining by the apparatus 10 and may be a component of a gas turbine engine for example. The object 12 may comprise one or more concave surfaces for machining by the apparatus 10. For example, the object 12 may be a fan blade of a gas turbine engine where the root portion and the aerofoil portion define a filleted part (having a concave surface) there between. In other examples, the object 12 may be a turbine blade, a compressor blade, a stator vane, a variable guide vane, or a nozzle guide vane of a gas turbine engine. In further examples, the object 12 may be a marine propeller or a propeller for an aeroplane.

The controller 14, the actuators 16 and the sensors 18 may be coupled to one another via a wireless link and may consequently comprise transceiver circuitry and one or more antennas. Additionally or alternatively, the controller 14, the actuators 16, and the sensors 18 may be coupled to one another via a wired link and may consequently comprise interface circuitry (such as a Universal Serial Bus (USB) socket). It should be appreciated that the controller 14, the actuators 16 and the sensors 18 may be coupled to one another via any combination of wired and wireless links.

Figure 4:
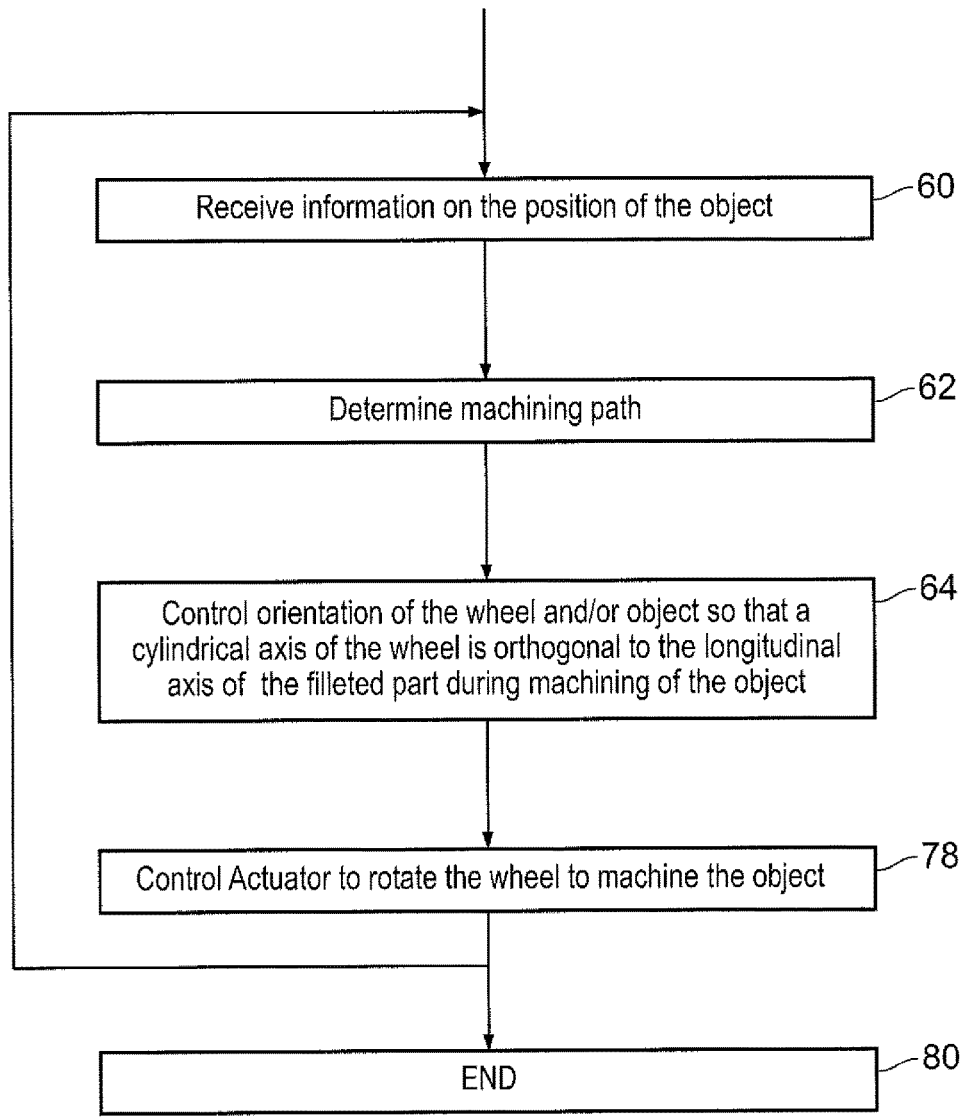
FIG. 4 illustrates a flow diagram of a method of machining an object according to various examples.

The controller 14 may comprise any suitable circuitry to cause performance of the methods described herein and as illustrated in FIG. 4. The controller 14 may comprise: at least one application specific integrated circuit (ASIC); and/or at least one field programmable gate array (FPGA); and/or single or multi-processor architectures; and/or sequential (Von Neumann)/parallel architectures; and/or at least one programmable logic controller (PLC); and/or at least one microprocessor; and/or at least one microcontroller; and/or a central processing unit (CPU); and/or a graphics processing unit (GPU), to perform the methods.

By way of an example, the controller 14 may comprise at least one processor 22 and at least one memory 24. The memory 24 stores a computer program 26 comprising computer readable instructions that, when read by the processor 22, causes performance of the methods described herein, and as illustrated in FIG. 4. The computer program 26 may be software or firmware, or may be a combination of software and firmware.

The processor 22 may include at least one microprocessor and may comprise a single core processor, may comprise multiple processor cores (such as a dual core processor or a quad core processor), or may comprise a plurality of processors (at least one of which may comprise multiple processor cores).

The memory 24 may be any suitable non-transitory computer readable storage medium, data storage device or devices, and may comprise a hard disk and/or solid state memory (such as flash memory). The memory 24 may be permanent non-removable memory, or may be removable memory (such as a universal serial bus (USB) flash drive or a secure digital (SD) card).

The computer program 26 may be stored on a non-transitory computer readable storage medium 28. The computer program 26 may be transferred from the non-transitory computer readable storage medium 28 to the memory 24. The non-transitory computer readable storage medium 28 may be, for example, a USB flash drive, a secure digital (SD) card, a compact disc (CD), a digital versatile disc (DVD) or a Blu-ray disc. In some examples, the computer program 26 may be transferred to the memory 24 via a signal 30 (which may be a wireless signal or a wired signal).

The one or more actuators 16 are configured to position and orient the wheel 20 and/or the object 12. In one example, the actuators 16 may include a first actuator (such as a servo motor) configured to move and orient the wheel 20 relative to the object 12, and a second actuator (such as a motor) configured to rotate the wheel 20 to machine the object 12. The object 12 may be held in a static position by one or more fixtures. In another example, the actuators 16 may include the first and second actuators as described above and may additionally include a third actuator (such as a servo motor) configured to move and orient the object 12 relative to the wheel 20. The controller 14 is configured to control the operation of the one or more actuators 16.

The one or more sensors 18 may comprise any suitable sensors for sensing the position of the surfaces of the object 12. For example, the one or more sensors 18 may comprise a contact three dimensional sensor such as a co-ordinate measuring machine (CMM) that is configured to sense the position of the surfaces of the object 12 using a mechanical probe. In another example, the one or more sensors 18 may additional or alternatively comprise a non-contact three dimensional sensor to sense the position of the surfaces of the object 12 using an acoustic wave sensor (such as an ultrasound sensor) or an electromagnetic wave sensor (such as an optical light sensor). The controller 14 is configured to control the operation of the one or more sensors 18 and is configured to receive information from the one or more sensors 18.

The wheel 20 is described in greater detail below with reference to FIGS. 2 and 3.

Figure 2:
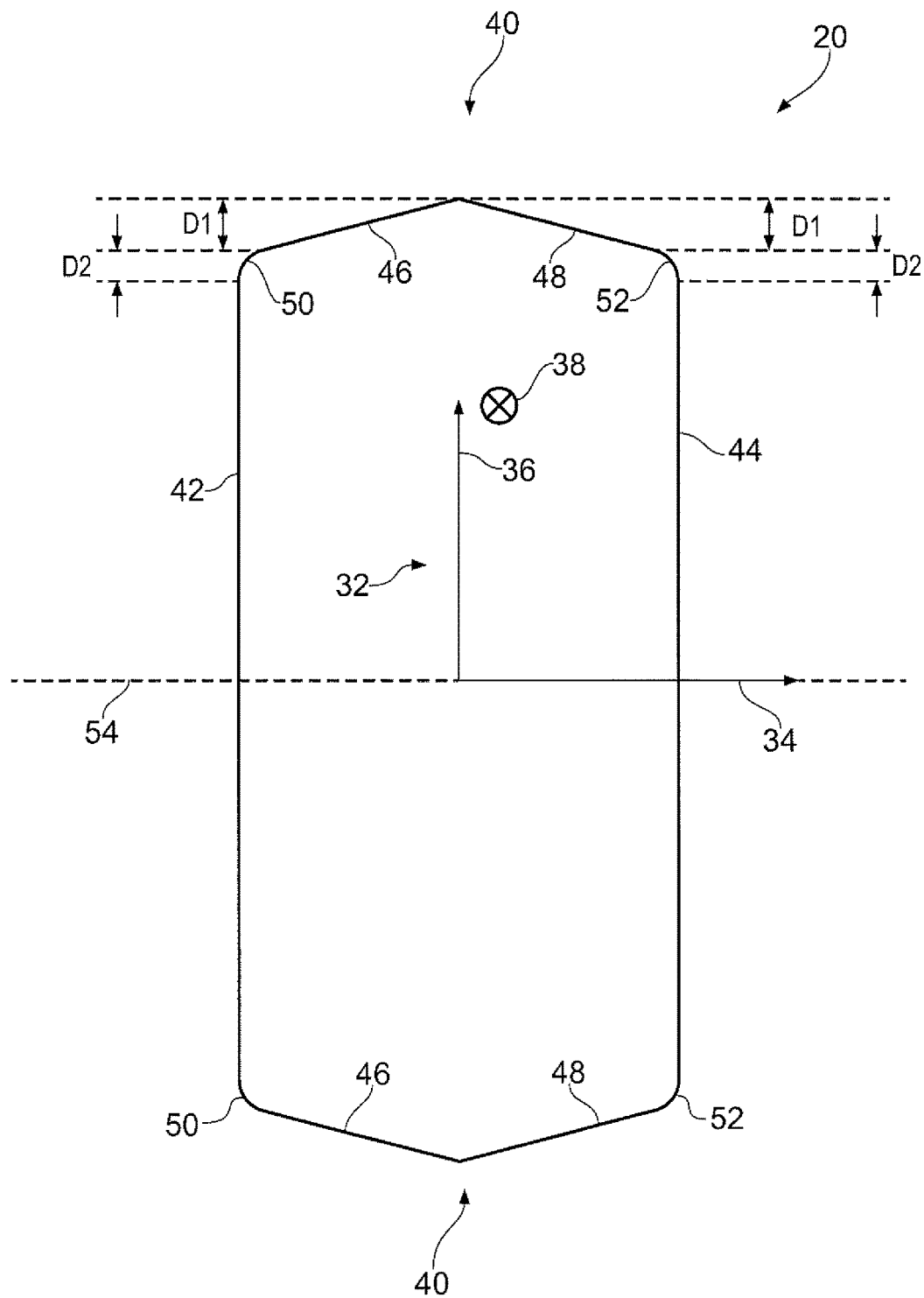
FIG. 2 illustrates a cross sectional diagram of a wheel according to various examples.

FIG. 2 illustrates a cross sectional diagram of the wheel 20 and a cylindrical polar coordinate system 32 according to various examples. The cylindrical polar coordinate system 32 includes a cylindrical axis 34 (which may also be referred to as a longitudinal axis 34), a polar axis 36 and an azimuthal axis 38 (that extends into the page as illustrated in FIG. 2).

The cylindrical axis 34, the polar axis 36 and the azimuthal axis 38 are orthogonal to one another.

The wheel 20 has a circumference 40 and includes: a first circular surface 42; a second circular surface 44, a first rim surface 46, a second rim surface 48, a first edge 50 and a second edge 52. The wheel 20 has a rotational axis 54 about which the wheel 20 is symmetrical. The cylindrical polar coordinate system 32 is positioned so that the cylindrical axis 34 is oriented parallel to, and extends along, the rotational axis 54. Furthermore, the origin of the cylindrical polar coordinate system 32 is positioned half way between the first circular surface 32 and the second circular surface 44.

The first circular surface 42 has a circular shape and is oriented parallel to the plane defined by the polar axis 36 and the azimuthal axis 38. Similarly, the second circular surface 44 has a circular shape and is oriented parallel to the plane defined by the polar axis 36 and the azimuthal axis 38. Consequently, the second circular surface 44 is oriented parallel to the first circular surface 42. The first and second circular surfaces 42, 44 may provide the hub of the wheel 20 into which a shaft, coupled to one of the actuators 16, may be inserted. The first and second circular surfaces 42, 44 may be planar (as illustrated in FIG. 2), or may be non-planar (as illustrated in FIG. 3).

The first rim surface 46 extends from the first circular surface 42 at the first edge 50 and defines at least a part of the circumference 40 of the wheel 20. A gradient of the first rim surface 46 (relative to the cylindrical axis 34) has a radial component (in other words, the first rim surface 46 extends in the cylindrical axis 34, the polar axis 36, and the azimuthal axis 38). Consequently, the first rim surface 46 has a tapered or chamfered profile relative to the first circular surface 42. In some examples, the first rim surface 46 may have a constant gradient along the cylindrical axis 34 (as illustrated in FIG. 2) between the first edge 50 and the opposite end of the first rim surface 46. In other examples, the first rim surface 46 may have a varying gradient along the cylindrical axis 34 (for example, the magnitude of the gradient of the first rim surface 46 may decrease in the positive direction of the cylindrical axis 34).

The second rim surface 48 extends from the second circular surface 44 at a second edge 52 and towards the first rim surface 46. The second rim surface 48 defines at least a part of the circumference 40 of the wheel 20. A gradient of the second rim surface 48 (relative to the cylindrical axis 34) has a radial component (in other words, the second rim surface 48 extends in the cylindrical axis 34, the polar axis 36 and the azimuthal axis 38). Therefore, the second rim surface 48 has a tapered or chamfered profile relative to the second circular surface 44. In some examples, the second rim surface 48 may have a constant gradient along the cylindrical axis 34 (as illustrated in FIG. 2) between the second edge 52 and the opposite end of the second rim surface 48. In other examples, the second rim surface 48 may have a varying gradient along the cylindrical axis 34 (for example, the magnitude of the gradient of the second rim surface 48 may increase in the positive direction of the cylindrical axis 34).

The first edge 50 defines a curved surface between the first circular surface 42 and the first rim surface 46. The magnitude of the gradient of the first edge 50 (relative to the cylindrical axis 34) may decrease in the positive direction of the cylindrical axis 34 as illustrated in FIG. 2. The second edge 52 defines a curved surface between the second circular surface 44 and the second rim surface 48. The magnitude of the gradient of the second edge 52 (relative to the cylindrical axis 34) may increase in the positive direction of the cylindrical axis 34. Consequently, the first edge 50 and the second edge 52 each define a fillet radius.

The first rim surface 46 has a depth of D1 along the polar axis. The second rim surface 48 may have the same depth along the polar axis 36 as the first rim surface 46 (that is, a depth of D1 as illustrated in FIG. 2), or may have a different depth to the first rim surface 46. The first edge 50 has a depth of D2 along the polar axis 36. The second edge 52 may have the same depth along the polar axis 36 as the first edge 50 (that is, a depth of D2 as illustrated in FIG. 2). The depths of the first and second rim surfaces 46, 48 (that is, the depth D1) may be the same as the depths of the first and second edges 50, 52 (that is, the depth D2). In other examples, the depths (D1) of the first and second rim surfaces 46, 48 may be different to the depths (D2) of the first and second edges 50, 52.

The first rim surface 46 and the second rim surface 48 may be directly joined to one another with no intervening surfaces there between as illustrated in FIG. 2. Consequently, the first rim surface 46 and the second rim surface 48 may define a vertex where they join one another. In other examples, the first rim surface 46 and the second rim surface 48 may be indirectly joined to one another where one or more intervening surfaces join the first rim surface 46 and the second rim surface 48 to one another.

The first rim surface 46 and the second rim surface 48 may be joined to one another (either directly or indirectly) at a location equidistant between the first circular surface 42 and the second circular surface 44 as illustrated in FIG. 2. In other examples, the first rim surface 46 and the second rim surface 48 may be joined to one another (either directly or indirectly) at a location that is either closer to the first circular surface 42 or closer to the second circular surface 44.

The first rim surface 46, the second rim surface 48, the first edge 50 and the second edge 52 may be arranged to receive an abrasive belt (illustrated in FIG. 8 for example) for linishing the object 12. In other examples, the first rim surface 46, the second rim surface 48, the first edge 50 and the second edge 52 may comprise an abrasive material for directly polishing or grinding the object 12.

The wheel 20 may include a hub (formed from the first and second circular surfaces 42, 44) comprising aluminium and a perimeter section (formed from the first rim surface 46, the second rim surface 48, the first edge 50, and the second edge 52) comprising rubber. In some examples, the rubber may have a hardness of 'Shore A—55 DURO' and have a Young's modulus of 1.9 MPa. In one example, the Young's modulus of the rubber may be 1.919 MPa.

Figure 3:
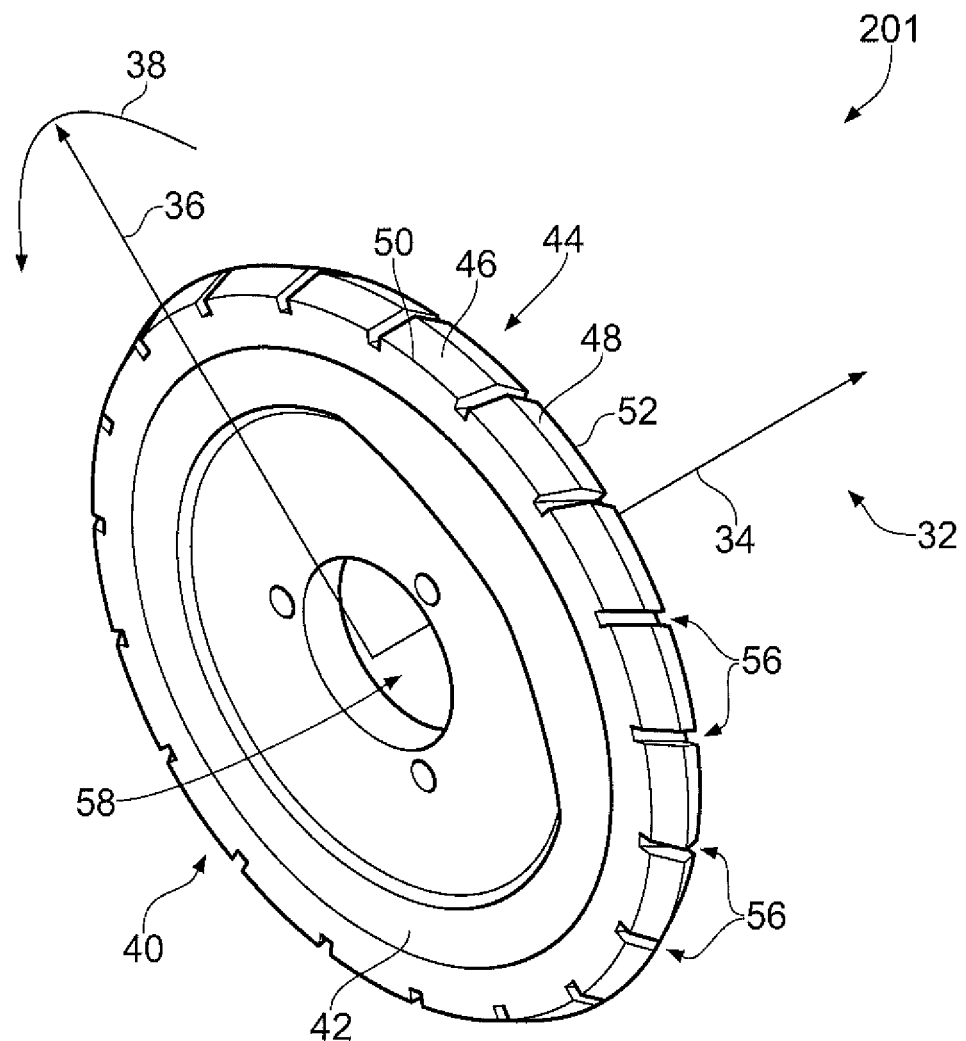
FIG. 3 illustrates a perspective view of another wheel according to various examples.

FIG. 3 illustrates a perspective view of another wheel 201 according to various examples. The wheel 201 is similar to the wheel 20 and where the features are similar, the same reference numerals are used.

The wheel 201 differs in that the first rim surface 46, the second rim surface 48, the first edge 50 and the second edge 52 define a plurality of grooves 56 that may advantageously increase the coefficient of friction of the circumference 40 of the wheel 201. The plurality of grooves 56 extend radially inwardly from the circumference 40 (that is, they extend from the circumference 40 and towards the origin of the cylindrical polar coordinate system 32 along the polar axis 36).

The wheel 201 also defines an aperture 58 for receiving a shaft coupled to one of the actuators 16. Additionally, the first and second circular surfaces 42, 44 are non-planar such that radially inner sections of the first and second circular surfaces 42, 44 are positioned closer together (along the cylindrical axis 34) than radially outer sections of the first and second circular surfaces 42, 44.

FIG. 4 illustrates a flow diagram of a method of machining an object 12 including one or more filleted parts according to various examples.

At block 60, the method may include receiving information on the position of the object 12. The controller 14 may control the one or more sensors 18 to determine the position of the surfaces of the object 12 and may then receive positional information on the sensed surfaces. For example, where the object 12 includes one or more filleted parts (that is, the object 12 has one or more parts having a concave surface), the controller 14 may control the sensors 18 to determine the position and orientation of those concave surfaces.

At block 62, the method may include determining a machining path using the information received at block 60. For example, the controller 14 may use the positional information received at block 60 to determine the path along which the wheel 20, 201 is to be moved to machine the one or more concave surfaces of the object 12.

At block 64, the method includes controlling orientation of the wheel 20, 201 and/or the object 12 so that the cylindrical axis 34 of the wheel 20, 201 is orthogonal to the longitudinal axis of the filleted part during machining of the object 12. The controller 14 may control one or more of the actuators 16 to rotate the wheel 20, 201 and/or the object 12 so that the cylindrical axis 34 of the wheel 20, 201 is orthogonal to the longitudinal axis of the filleted part.

Figure 5:
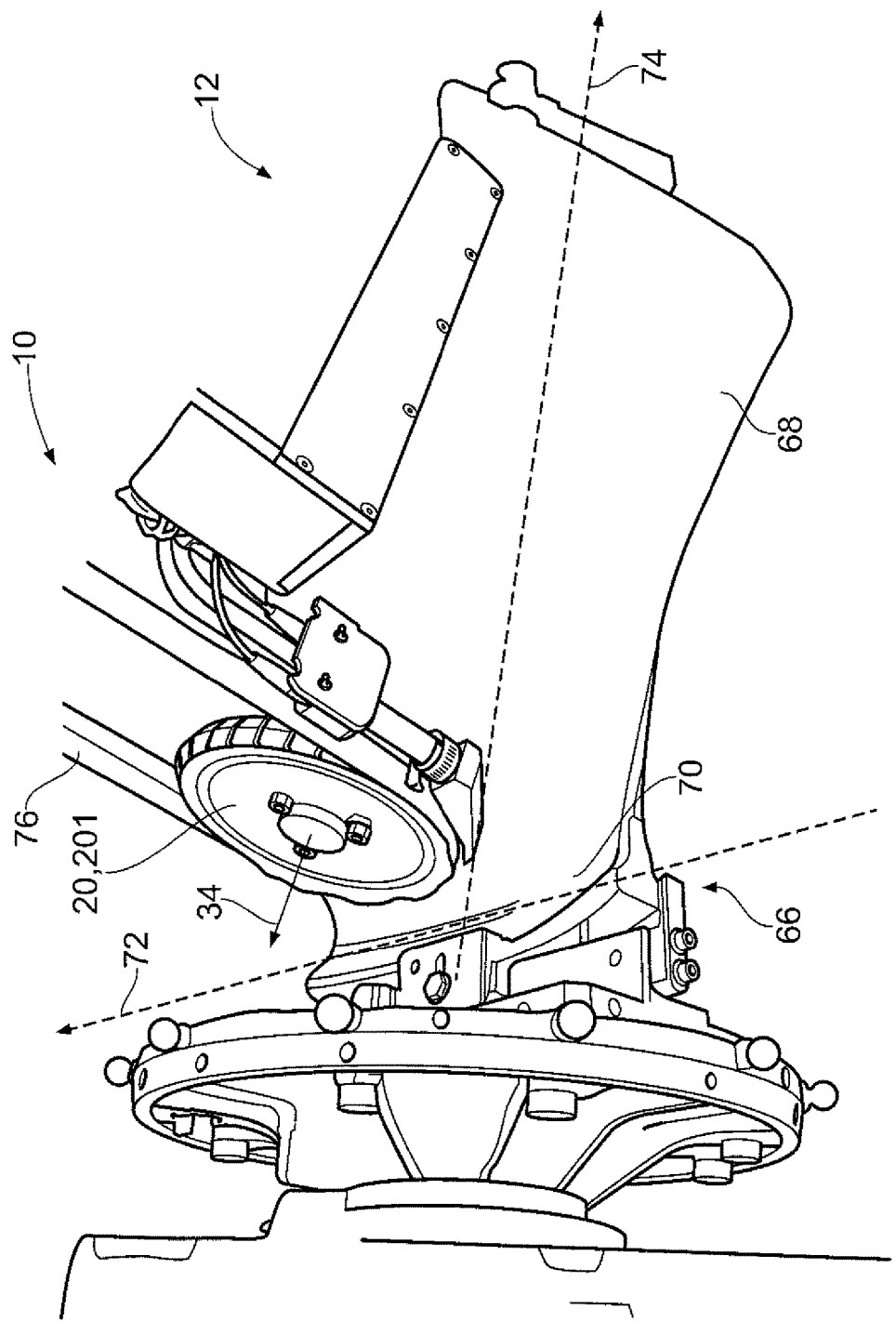
FIG. 5 illustrates a perspective view of a fan blade to be machined by a wheel according to various examples.

FIG. 5 illustrates a perspective view of a fan blade 12 to be machined by the wheel 20, 201 according to various examples.

The fan blade 12 includes a root portion 66 and an aerofoil portion 68 that define a filleted part 70 there between. The filleted part 70 has a longitudinal axis 72 and the aerofoil portion 68 has a longitudinal axis 74. The longitudinal axis 72 of the filleted part 70 is orthogonal to the longitudinal axis 74 of the aerofoil portion 68.

The apparatus 10 includes an abrasive belt 76 that extends around the wheel 20, 201 and forms an endless loop. It should be appreciated that in other examples, the apparatus 10 may not include the abrasive belt 76 and instead, the wheel 20, 201 may comprise an abrasive material for directly machining the fan blade 12.

As illustrated in FIG. 5, the wheel 20, 201 has been re-oriented by the actuators 16 (which comprise a robotic arm in this example) so that the cylindrical axis 34 of the wheel 20, 201 is orthogonal to the longitudinal axis 72 of the filleted part 70. In other words, the wheel 20, 201 has been re-oriented so that the circumference 40 of the wheel 20, 201 is parallel to the longitudinal axis 72 of the filleted part 70.

Figure 6:
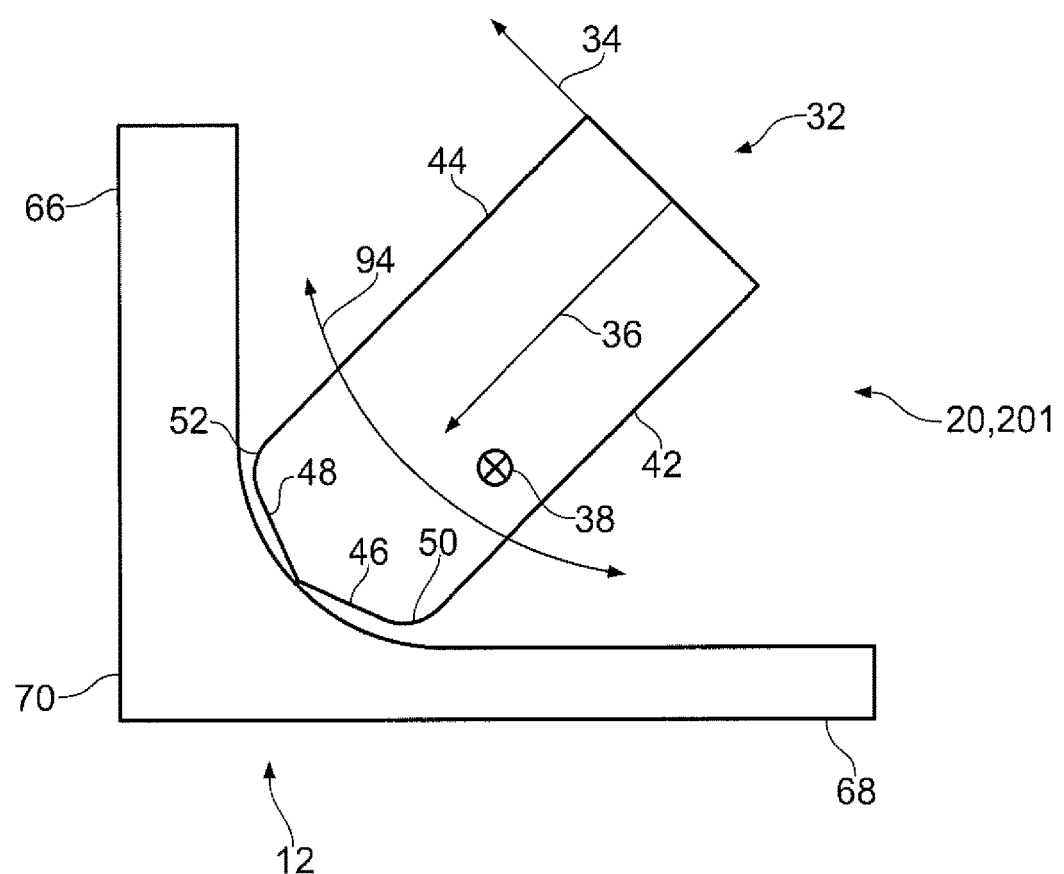
FIG. 6 illustrates a schematic diagram of the fan blade illustrated in FIG. 5 being machined by a wheel according to various examples.

At block 78, the method includes controlling one or more of the actuators 16 to rotate the wheel 20, 201 about the axis 54 in the direction of the azimuthal axis 38 (either the positive or the negative direction of the azimuthal axis 38) to machine the fan blade 12. For example, the controller 14 may control the actuators 16 to rotate the wheel 20, 201 and to move the wheel 20, 201 into contact with the filleted part 70 of the fan blade 12 as illustrated in FIG. 6. The controller 14 may then control the actuators 16 to move the wheel 20, 201 along the longitudinal axis 72 of the filleted part 70 to machine along the length of the filleted part 70.

Once machining is completed, the method may end at block 80. Alternatively, the method may return to block 60 and the controller 14 may control the one or more sensors 18 to sense the position of the surfaces of the fan blade 12 to determine whether further machining of the fan blade 12 is required. Where the controller 14 determines that further machining is required, the method proceeds through blocks 62, 64 and 78.

Figure 7:
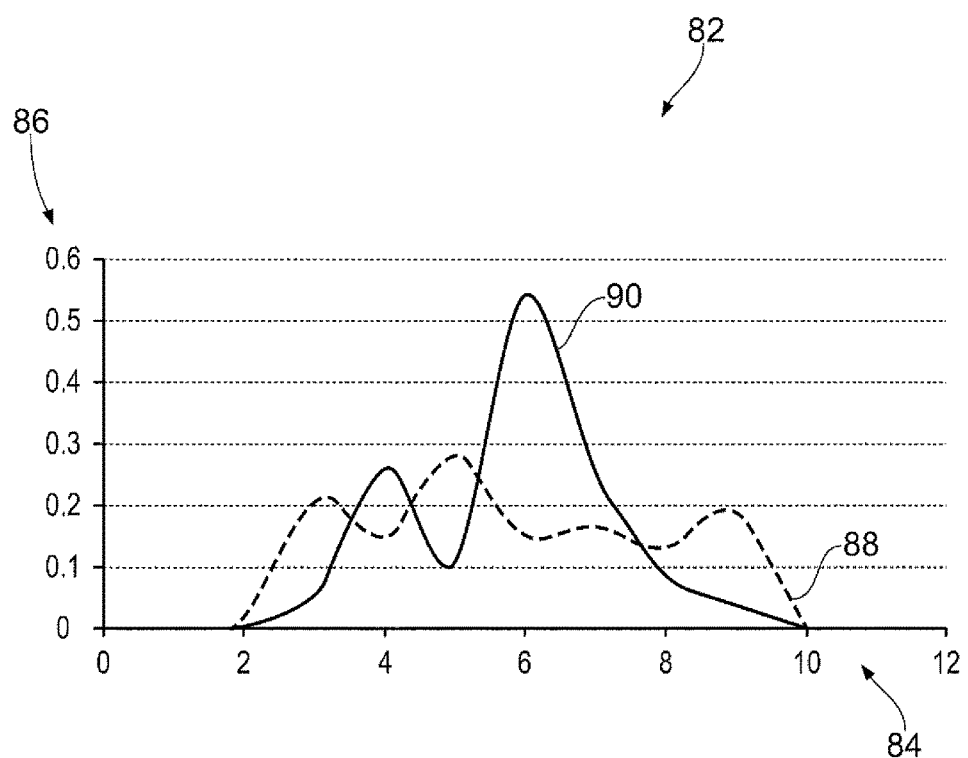
FIG. 7 illustrates a graph of pressure applied by two different wheels along a radial length of a concave surface of the fan blade illustrated in FIGS. 5 and 6 according to various examples.

FIG. 7 illustrates a graph 82 of pressure applied by two different wheels along a radial length of the filleted part 70 of the fan blade 12 illustrated in FIG. 6. In more detail, the graph 82 includes a horizontal axis 84 for the radial position (in millimeters) along the surface of the filleted part 70, and a vertical axis 86 for the pressure (in kilograms per square millimeter) applied by the wheel 20, 201. The graph 82 also includes a dotted line 88 for the pressure applied by a first wheel 20, 201, and a solid line 90 for the pressure applied by a second wheel 20, 201.

The first wheel 20, 201 has a depth D1 of two millimeters and a depth D2 of two millimeters. The second wheel 20, 201 has a depth D1 of four millimeters and a depth D2 of two millimeters. As illustrated in FIG. 7, the first wheel 20, 201 has a generally flat pressure profile with a peak of approximately 0.29 kilograms per square millimeter at the radial distance of 5 millimeters. The second wheel 20, 201 has a more uneven pressure profile with a peak of approximately 0.55 kilograms per square millimeter at the radial distance of 6 millimeters. The second wheel 20, 201 may be preferred for machining where higher pressure and material removal are desired. The first wheel 20, 201 may be preferred for machining where lower pressure and material removal are desired.

It should be appreciated that the values of D1 and D2 mentioned above are provided as an example only and that D1 and D2 may have different values in other examples.

Figure 8:
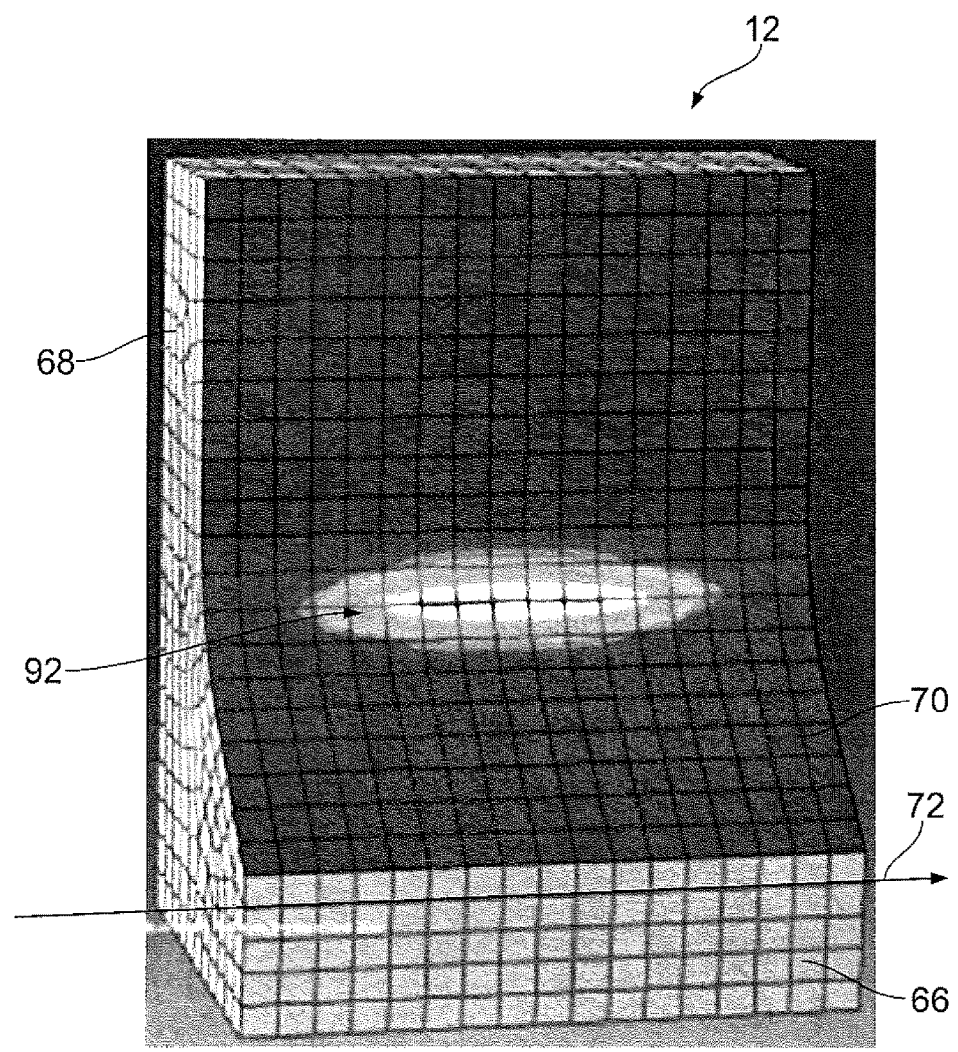
FIG. 8 illustrates a perspective view of the fan blade illustrated in FIGS. 5 and 6 and the distribution of pressure applied by the wheel according to various examples.

FIG. 8 illustrates a perspective view of the fan blade 12 illustrated in FIGS. 5 and 6 and the distribution of pressure 92 applied by the second wheel 20, 201 mentioned in the preceding paragraphs as the second wheel 20, 201 is moved along the longitudinal axis 72. The distribution of pressure 92 has an elliptical shape and the pressure increases towards the centre of the ellipse (illustrated in FIG. 8 where a lighter shade of grey indicates a higher pressure applied by the second wheel 20, 201 on the filleted part 70).

The apparatus 10 may provide several advantages. First, the profile of the circumference 40 of the wheel 20, 201 (in particular, the chamfered and fillet radii profile) may enable the wheel 20, 201 to access concave surfaces of an object 12 to machine such surfaces. Consequently, the apparatus 10 and method described in the preceding paragraphs may finish the object 12 to a higher level of quality.

Second, the profile of the circumference 40 of the wheel 20, 201 may enable machining of concave surfaces to be computer controlled. This may reduce industrial injuries caused by machining and may also reduce the risk of a fire caused by dust from machining (since the machining may be performed in a confined environment where dust is thoroughly extracted).

Third, the wheel 20, 201 may be manufactured to be compatible with existing robotic apparatus and may consequently be relatively inexpensive to implement. For example, the aperture 58 and the first and second circular surfaces 42, 44 may be manufactured to fit one or more existing robotic apparatus.

Fourth, the fillet edges 50, 52 in the wheel 20, 201 may reduce the possibility of 'under-cutting' (the wheel digging into the surface of the object 12) while the wheel moves up and down along the concave feature (arrow 94 in FIG. 6 for example represents motion along the concave feature).

It will be understood that the invention is not limited to the embodiments above-described and various modifications and improvements can be made without departing from the concepts described herein. For example, only one of the edges 50, 52 may define a curved surface. In other words, only one of the edges 50, 52 may define a fillet radius and the other one of the edges 50, 52 may define a vertex.

Except where mutually exclusive, any of the features may be employed separately or in combination with any other features and the disclosure extends to and includes all combinations and sub-combinations of one or more features described herein.

What is claimed is:

1. An apparatus for machining an object, the apparatus comprising:
    a wheel having a circumference, the wheel including:
        a first circular surface;
        a second circular surface oriented parallel to the first circular surface;
        a first rim surface extending from the first circular surface at a first edge and defining at least a part of the circumference of the wheel, the first rim surface having a constant gradient between the first edge and an opposite end of the first rim surface, the gradient of the first rim surface having a radial component greater than zero; and
        a second rim surface extending from the second circular surface at a second edge and towards the first rim surface, the second rim surface defining at least a part of the circumference of the wheel, the second rim surface having a constant gradient between the second edge and an opposite end of the second rim surface, the gradient of the second rim surface having a radial component greater than zero, the first edge defining a first curved surface between the first circular surface and the first rim surface, and the second edge defining a second curved surface between the second circular surface and the second rim surface.

2. The apparatus as claimed in claim 1, wherein the first rim surface and the second rim surface are directly joined with no intervening surfaces there between.

3. The apparatus as claimed in claim 2, wherein the first rim surface and the second rim surface abut one another at a location equidistant between the first circular surface and the second circular surface.

4. The apparatus as claimed in claim 1, wherein the first rim surface, the second rim surface, the first edge and the second edge are configured to receive an abrasive belt for finishing the object.

5. The apparatus as claimed in claim 1, wherein the first rim surface, the second rim surface, the first edge and the second edge comprise an abrasive material for polishing or grinding the object.

6. The apparatus as claimed in claim 1, wherein the first rim surface, the second rim surface, the first edge and the second edge define a plurality of grooves.

7. The apparatus as claimed in claim 1, the apparatus further comprising a controller, wherein:
    the object includes a filleted part extending along a longitudinal axis, and
    the controller is configured to control orientation of the wheel or the object so that a cylindrical axis of the wheel is orthogonal to the longitudinal axis of the filleted part during the machining of the object.

8. The apparatus as claimed in claim 1, wherein the wheel includes:
    a hub including aluminum, and
    a perimeter section including rubber.

9. A method of controlling the apparatus claimed in claim 1 to machine an object including a filleted part extending along a longitudinal axis, the method comprising:
    controlling orientation of the wheel or the object such that a cylindrical axis of the wheel is orthogonal to the longitudinal axis of the filleted part during the machining of the object.

10. A non-transitory computer readable storage medium comprising computer readable instructions that, when read by a computer, cause performance of the method of controlling the apparatus as claimed in claim 9.

* * * * *